(12) United States Patent
Augustsson

(10) Patent No.: US 6,295,397 B1
(45) Date of Patent: Sep. 25, 2001

(54) WAVELENGTH SELECTIVE MODULATOR

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/506,831

(22) Filed: Feb. 18, 2000

(30) Foreign Application Priority Data

Feb. 19, 1999 (SE) .................................................... 9900579

(51) Int. Cl.$^7$ ...................................................... G02B 6/28
(52) U.S. Cl. ............................................................... 385/24
(58) Field of Search ............................... 385/24–27, 147;
359/139, 128, 138, 158; 455/276.1, 139, 277.2, 304, 337

(56) References Cited

U.S. PATENT DOCUMENTS

| | | | |
|---|---|---|---|
| 4,469,961 | * 9/1984 | Milberger et al. | 327/110 |
| 5,204,979 | * 4/1993 | Schenkyr et al. | 455/276.1 |
| 5,333,000 | * 7/1994 | Hietala et al. | 342/368 |
| 5,561,395 | * 10/1996 | Melton et al. | 330/2 |
| 5,999,293 | * 12/1999 | Manniong | 359/139 |

FOREIGN PATENT DOCUMENTS

| | | |
|---|---|---|
| 0 778 479 A2 | 6/1997 | (EP) . |
| 0 814 629 A2 | 12/1997 | (EP) . |
| 0 901 024 A2 | 3/1999 | (EP) . |
| 0 903 616 A2 | 3/1999 | (EP) . |
| WO 95/12828 | 5/1995 | (WO) . |
| WO 98/39679 | 9/1998 | (WO) . |
| WO 98/39686 | 11/1998 | (WO) . |
| WO 99/12297 | 3/1999 | (WO) . |

\* cited by examiner

*Primary Examiner*—Akm E. Ullah
(74) *Attorney, Agent, or Firm*—Burns, Doane, Swecker & Mathis, L.L.P.

(57) ABSTRACT

The present invention relates to a device and to a method for modulating optical wavelength channels. The optical wavelength channels are switched to at least one access waveguide arranged on a first side of a first multimode waveguide (10). The wavelength channels are then transmitted through the multimode waveguide (10) and imaged on at least two connecting waveguides provided on an opposite side. The optical wavelength channels are then transmitted through the connecting waveguides. For each wavelength selective cross-switch structure (2, 4, 6, 8), the phase of a reflected wavelength is changed by two phase control elements (C1, C2, D1, D2, E1, E2, F1, F2) arranged in a first and a second connecting waveguide on a first side of said wavelength selective cross-switch structure (2, 4, 6, 8) over a given time period and slightly time shifted in relation to the second phase control element, at the same time as the phase of the reflecting wavelength remains relatively unchanged on a second side of said wavelength selective cross-switch structure (2, 4, 6, 8). For each wavelength selective cross-switch structure (2, 4, 6, 8), the phase of transmitting wavelengths is changed once in a first and a second direction per wavelength selective cross-switch structure (2, 4, 6, 8). The phase relationship between the optical signal in respective access waveguides arranged on the first side of the second multimode waveguide (20) determines where the optical signal will be focused on the opposite side.

14 Claims, 3 Drawing Sheets

WAVELENGTH SELECTIVE MODULATOR

This application claims priority under 35 U.S.C. §§119 and/or 365 to 9900579-5 filed in Sweden on Feb. 19, 1999; the entire content of which is hereby incorporated by reference.

FIELD OF INVENTION

The present invention relates to an optical wavelength selective device, and more particularly to a wavelength selective modulator with which each wavelength channel can be modulated separately and independently of other wavelength channels. The invention also relates to a method of modulating wavelength channels in an optical network.

DESCRIPTION OF THE BACKGROUND ART

Various different methods are known for improving the capacity of existing optical networks. One method involves the use of so-called wavelength multiplexing technology (WDM) for improving the extent to which available bandwidths can be utilised on an optical fibre in the optical network. Wavelength can also be used in an optical network as an information address. This requires the use of different types of wavelength selective components. For instance, wavelength selective modulators (WSM) may be used to this end.

No methods or devices are at present available for the wavelength selective modulation of optical channels in cases when the channels lie relatively close to one another, which presents a problem.

SUMMARY OF THE INVENTION

The present invention addresses the aforesaid problem with the aid of a wavelength selective modulator that includes at least two multimode waveguides, at least one wavelength selective cross-switch structure, at least two controllable phase control elements, and at least four connecting waveguides. The wavelength selective cross-switch structure is disposed between a first and a second multimode waveguide. The first multimode waveguide is connected to at least one access waveguide on a first side and at least two access waveguides on a second side, and said second multimode waveguide is connected to at least two access waveguides on a first side and at least one access waveguide on a second side. The wavelength selective cross-connector structure is connected to at least two access waveguides on a first and a second side.

In a wavelength selective cross-switch structure, a first access waveguide on the second side of the first multimode waveguide is connected to a first access waveguide on the first side of the wavelength selective cross-switch structure via a first connecting waveguide, a second access waveguide on the second side of the first multimode waveguide is connected to a first access waveguide on the second side of the wavelength selective cross-switch structure via a second connecting waveguide, a second access waveguide on the first side of the wavelength selective cross-switch structure is connected to a first access waveguide on the first side of the second multimode waveguide via a third connecting waveguide, and a second access waveguide on the second side of the wavelength selective cross-switch structure is connected to a second access waveguide on the first side of the second multimode waveguide via a fourth connecting waveguide.

The phase control elements are disposed in the connecting waveguides on the one side of the wavelength selective cross-switch structure. A first phase control element is adapted to change the phase for a given time period Δt1 which is earlier (by τ time units) than the time at which a second phase control unit is adapted to change the phase for a time period Δt2 by a time difference that corresponds to the time taken for reflected light to travel from the first phase control element to the second phase control element or the time taken for the light to travel in the one connecting waveguide from a point which is located at the same distance from the output of the first multimode waveguide as the distance of the first controllable phase control element in the second connecting waveguide from the second controllable phase control element.

A cross-switch structure includes two mutually different so-called Mach-Zehnder paths for each individual wavelength in the optical signal. A first Mach-Zehnder path passes from a first access waveguide on the second side of the first multimode waveguide to the second access waveguide on the first side of the second multimode waveguide via the first and the fourth connecting waveguide and via the wavelength selective cross-switch structure for wavelengths that are transmitted through said structure.

A second Mach-Zehnder path passes from a second access waveguide on the second side of the first multimode waveguide to the first access waveguide on the first side of the second multimode waveguide via the second and the third connecting waveguide and via the wavelength selective cross-switch structure for wavelengths that are transmitted through said structure.

A third Mach-Zehnder path passes from a first access waveguide on the second side of the first multimode waveguide to the first access waveguide on the first side of the second multimode waveguides via the first and the third connecting waveguide and via the wavelength selective cross-switch structure for wavelengths that are reflected by said structure.

A fourth Mach-Zehnder path passes from a second access waveguide on the second side of the first multimode waveguide to the second access waveguide on the first side of the second multimode waveguide via the second and the fourth connecting waveguides and via the wavelength selective cross-switch structure for wavelengths that are reflected by the cross-switch structure.

Only wavelengths that are reflected in a cross-switch structure can be controlled actively, in other words the wavelength that passes via the third or the fourth Mach-Zehnder path in accordance with what has been described.

The Mach-Zehnder paths are essentially of the same length in the inventive wavelength selective modulator. A small wavelength difference is experienced in practice, because reflection does not occur in the centre of the cross-switch structure.

Thus, in the case of one wavelength selective cross-switch structure there is included two different Mach-Zehnder paths or routes for wavelengths that are reflected by the cross-switch structure and two different Mach-Zehnder paths for wavelengths that are transmitted through said structure. In the case of two wavelength selective cross-switch structures, there is included four different Mach-Zehnder paths for two different wavelengths and for N-number of wavelength selective cross-switch structures There is thus included 2×N number of different Mach-Zehnder paths for N-number of wavelengths.

The first and the second multimode waveguides will preferably have the same length-width ratio when said waveguides are of the same type, i.e. of the 2×2-type, for instance. In one embodiment of the invention, the multimode waveguide may comprise an MMI waveguide.

In the case of two or more wavelength selective cross-switch structures, there is included for each wavelength selective cross-switch structure two phase control elements and two connecting waveguides. Each wavelength selective cross-switch structure is provided with two phase control elements, a first and a second phase control element, on opposite sides in relation to a nearest adjacent wavelength selective cross-switch structure. Each of the first of said phase control elements is adapted to change the phase for a given time period t1 which is earlier (by $\tau$ time units) than the time at which respective second phase control elements are intended to change the phase during a time period t2 by an amount that corresponds to the time taken for reflected or transmitted light to travel to said second phase control element from the nearest adjacent phase control element. The wavelength selective cross-switch structures are mutually connected via a connecting waveguide from an access waveguide on a first wavelength selective cross-switch structure to another access waveguide on an adjacent wavelength selective cross-switch structure. These access waveguides are chosen so as to lie closely adjacent to one another on one and the same side.

In one inventive method of modulating optical wavelength channels in an optical network, wavelength channels are excited into at least one access waveguide provided on a first side of a first multimode waveguide. The optical wavelength channels are then transmitted to said first multimode waveguide and imaged on at least two connecting waveguides arranged on the opposite side relative to said access waveguide. The optical wavelength channels are then transmitted through the connecting waveguides.

For each wavelength selective cross-switch structure, the phase of a reflected wavelength is changed two times by two phase control element disposed in a first and a second connecting waveguide on a first side of said wavelength selective cross-switch structure, at the same time as the phase of the reflecting wavelength remains essentially unchanged on the other side of the wavelength selective cross-switch structure.

The phase of transmitting wavelengths is changed once for each wavelength selective cross-switch structure, when ignoring the passive adjustment section The optical wavelength channels are excited in via at least two connecting waveguides in a second multimode waveguide.

The phase relationship of respective wavelengths is decisive in determining how much power of said wavelength is transmitted and to which of the output waveguides of the multimode waveguide, respective wavelengths are transmitted. The phase control elements associated with a specific wavelength selective cross-switch structure work with a certain time delay $\tau$ in relation to one another and change the phase to the same extent.

In one inventive embodiment, the wavelength selective direction switching structures are of the MMI Bragg grating type.

The aim of the present invention is to provide a wavelength selective modulator with which each wavelength can be modulated independently of the other wavelengths and excited into one of the two outputs, and which is of simple and compact construction such as to enable manufacturing costs to be reduced in comparison with present-day technology.

One advantage afforded by the present invention is that in one embodiment the arrangement can be used to add a first wavelength channel, drop a second wavelength channel while modulating a third wavelength channel at the same time.

The invention will now be described in more detail with reference to preferred embodiments thereof and also reference to the accompanying drawings.

DETAILED DESCRIPTION OF PREFERRED EMBODIMENTS

Figure 1:
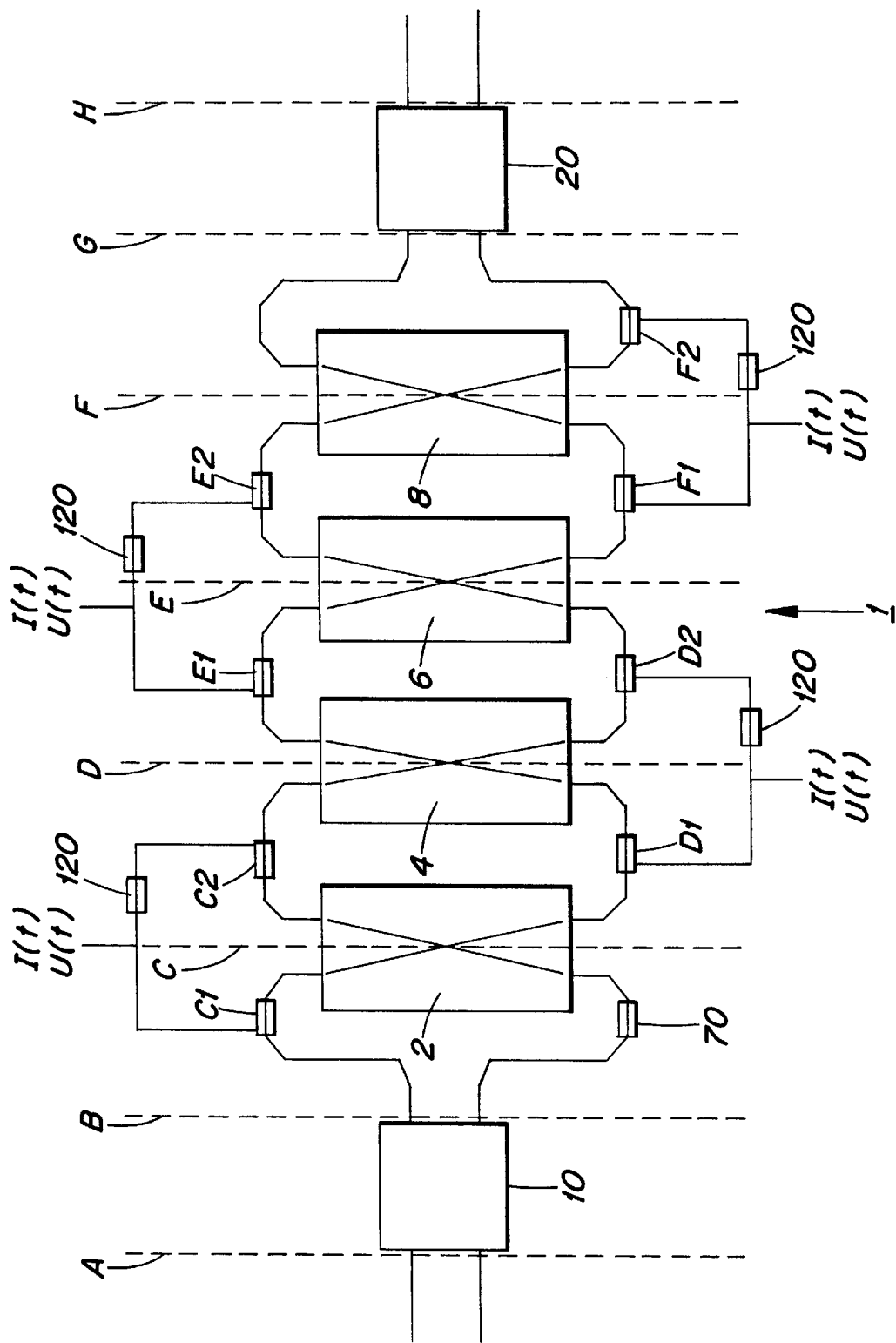
FIG. 1 illustrates an embodiment of an inventive wavelength selective modulator.

FIG. 1 illustrates an embodiment of an inventive wavelength selective modulator 1. The wavelength selective modulator 1 includes two multimode waveguides 10, 20, four wavelength selective cross-switch structures 2, 4, 6, 8, eight controllable phase control elements C1, C2, D1, D2, E1, E2, F1, F2, a passive adjustment section (PAS) 70, ten connecting waveguides and access waveguides arranged on the two multimode waveguides 10, 20 and on the cross-switch structures 2, 4, 6, 8.

An optical signal which includes a number of different wavelengths is excited into the access waveguide provided on a first side of a first multimode waveguide 10. The optical signal is transmitted through the multimode waveguide 10 and imaged on the access waveguides provided on an opposite second side to where the optical signal was excited in. The signal is imaged in relation to the length-width ratio of the multimode guide 10 and to the placement of the access waveguides. Assume that the length-width ratio is such that an optical signal which is excited in on a first side of the multimode waveguide 10 is imaged equally in the two access waveguides arranged on the opposite side, i.e. that the optical signal has been divided equally in two with half the intensity in the two access waveguides. Connecting waveguides are connected to the access waveguides on the second side of the first multimode waveguide 10. A first connecting waveguide is connected to a first access waveguide on a first side of a first wavelength selective cross-switch structure 2. A second connecting waveguide is connected to a first access waveguide provided on a second side of the first wavelength selective cross-switch structure 2. One of these connecting waveguides includes a phase control element C1 and the other of said connecting waveguides includes a passive adjustment section 70. It will be readily understood that the passive adjustment section can equally as well be provided somewhere else along one of the Mach-Zehnder arms, preferably at a location where no phase control element is found. In the case of the FIG. 1 embodiment, the phase control element C1 is included in the first connecting waveguide, while the passive adjustment section is included in the second connecting waveguide. A second wavelength selective cross-switch structure 4 is connected to the first wavelength selective cross-switch structure via two connecting waveguides. A second access waveguide provided on the first side of the first wavelength selective cross-switch structure is connected to a first access waveguide on the first side of the second wavelength selective cross-switch structure 4 via a third connecting waveguide. A second access waveguide on the other side of the first wavelength selective cross-switch structure 2 is connected to a first access waveguide on a second side of the second wavelength selective cross-switch structure 4 via a fourth connecting waveguide.

FIG. 1 shows that four wavelength selective cross-switch structures 2, 4, 6, 8 are disposed in mutually sequential relationship. The wavelength selective cross-switch structures 2, 4, 6, 8 are mutually connected via connecting waveguides from an access waveguide on a first wavelength selective cross-switch structure to another access waveguide on an adjacent wavelength selective cross-switch structure, where said access waveguides are chosen so as to lie closely adjacent one another and on the same side.

A last wavelength selective cross-switch structure 8 is connected to a second multimode waveguide 20 via a connecting conductor. A second access waveguide on a first side of the last wavelength selective cross-switch structure 8 is connected to a first access waveguide on a first side of the second multimode waveguide 20 via a connecting waveguide. A second access waveguide on a second side of the last wavelength selective cross-switch structure 8 is connected to a second access waveguide on the first side of the second multimode waveguide 20 via a connecting waveguide. The FIG. 1 embodiment includes two waveguides on a second side of the second multimode waveguide 20.

As before mentioned, the optical signal applied to the access waveguide along section A on the first side of the first multimode waveguide 10 is first transmitted through said first multimode waveguide 10 and imaged along section B on the two connecting waveguides disposed on the opposite side in relation to said access waveguide. The optical signal is then transmitted in the two connecting waveguides. One of these connecting waveguides has a phase control element C1 disposed therein. This phase control element C1 influences all wavelengths that pass therethrough. The optical signal is then switched into the first wavelength selective cross-switch structure 2 at section C. Each of these wavelength selective cross-switch structures 2, 4, 6, 8 in respective sections C, D, E and F is adapted to reflect one wavelength and transmit the remainder. Assume that the first wavelength selective cross-switch structure 2 in section C is adapted to reflect one wavelength λ1, that the second wavelength selective cross-switch structure 4 in section D is adapted to reflect a wavelength λ2, that the third wavelength selective cross-switch structure in section C is adapted to reflect a wavelength λ3, and that the fourth wavelength selective cross-switch structure 8 in section F is adapted to reflect a wavelength λ4.

With respect to wavelengths λ1, λ2, λ3, λ4, each of these wavelengths is reflected by one, and only one, wavelength selective cross-switch structure 2, 4, 6, 8 and is transmitted through the remaining structures.

In the case of the FIG. 1 embodiment, each wavelength channel which is reflected by a wavelength selective cross-switch structure that transmits out through one connecting waveguide along section B will be influenced by two controllable phase control elements in comparison with those wavelength channels that are reflected by one of the wavelength selective cross-switch structures that transmits out through the other connecting waveguide along section B. For instance, when wavelength λ1 reaches the first side of the second multimode waveguide 20 along section G, the phase will differ between the first and the second access waveguide by virtue of the fact that said wavelength has been influenced by different numbers of phase control elements C1, C2, D1, D2, E1, E2, F1, F2, as before mentioned. The phases of the various reflected wavelengths in the first and the second access waveguide along section G will mutually differ. In one of these access waveguides along section G in FIG. 1, the phase of a given reflected wavelength has been changed two times more than the phase in the second access waveguides, when the passive adjustment section 70 is disregarded. Naturally, compensation must be made in the phase control element C1, C2, D1, D2, E1, E2, F1, F2 for the passive adjustment section 70. Each reflected wavelength has a unique path, Mach-Zehnder path, through the structure. This enables a wavelength to be influenced independently of the remaining wavelengths and each of the reflected wavelengths can be guided to a desired output along section H, with the aid of a suitable configuration regarding length, width and placement of access waveguides on the second multimode waveguide 20.

As before mentioned, the wavelength λ1 is reflected in the cross-switch structure along section C, whereas all other wavelength channels are transmitted through said structure. This means that if the two phase control elements C1 and C2 operate with the same phase change and C2 is delayed τ time units in relation to C1, the phase displacement in respect of C1 and C2 will only influence the wavelength λ1 during the time that C1 and C2 are active, i.e. when they influence the phase of the optical signal. The time delay τ may be the time taken for the light to travel from the passive adjustment section to the second phase control element or the time taken for the light to travel from the first phase control element to the second phase control element. Which of the first and the second time delays is chosen will depend on whether it is desired to optimise the reflected wavelength or the transmitted wavelengths. Normally, it is desired to achieve minimum interference with non-switched (modulated) channels and consequently τ is the time taken for the light to pass from the passive adjustment section (PAS) 70 to the phase control element C2.

In the FIG. 1 embodiment, four mutually different wavelengths can be modulated at one and the same time and independently of one another and can be controlled to any selected output on the MMI waveguide 20.

For a given length-width ratio on the second multimode waveguide, the phase relationship between the optical signals in the access waveguides along section G determines where the optical signal will be focused along section H.

It is preferred that the phase control elements operate with a time delay τ that corresponds to the time taken for the light to pass from the passive adjustment section (PAS) 70 to the phase control element C2 and with the same phase change.

The phase control elements are preferably controlled electro-optically, so as to achieve sufficiently short response times.

Alternatively, the phase control elements may be controlled by current injection, when the phase control elements are in semiconductor material.

Figure 3:
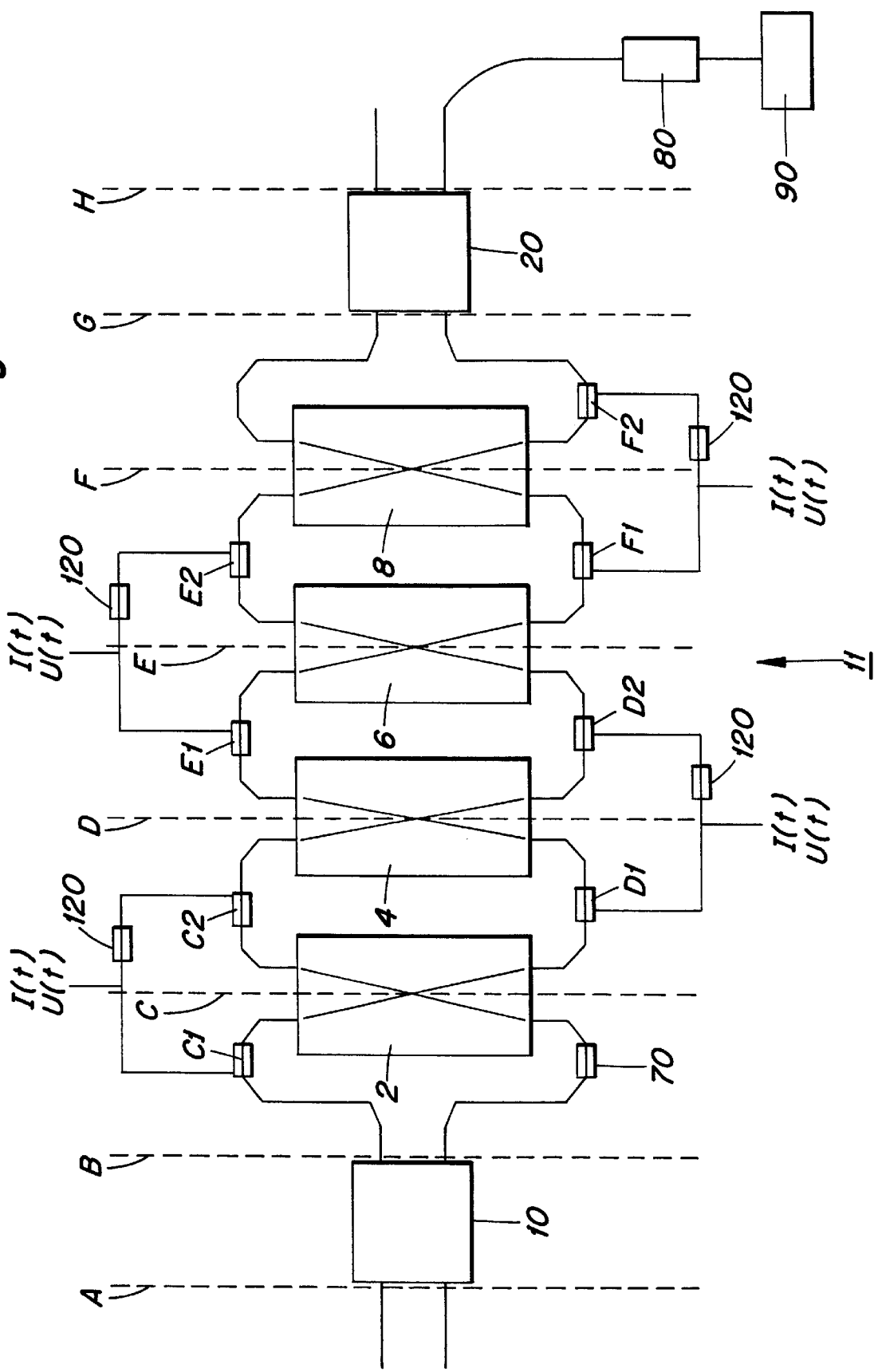
FIG. 3 illustrates another embodiment of an inventive wavelength selective modulator that has a wavelength selective add/drop function.

The time delay τ may, for instance, be obtained by controlling the voltage U(t) or the current I(t) with the aid of a control unit having a delay unit for C1, C2, D1, D2, E1, E2, F1 and F2, said voltage and current both being a function of time, so as to enable the phase of the light signal to be changed at a given point of time and for a given time interval. A simpler way of obtaining the delay is by using a longer electrical connection to one phase control element than to the other phase control element. In FIGS. 1 and 3, the time delay for each cross-switch structure has been represented by a time delay section 120.

The passive adjustment section 70 can be assumed to lie on precisely the same optical wavelength from the first MMI waveguide 10 as the phase control element C1.

Figure 2:
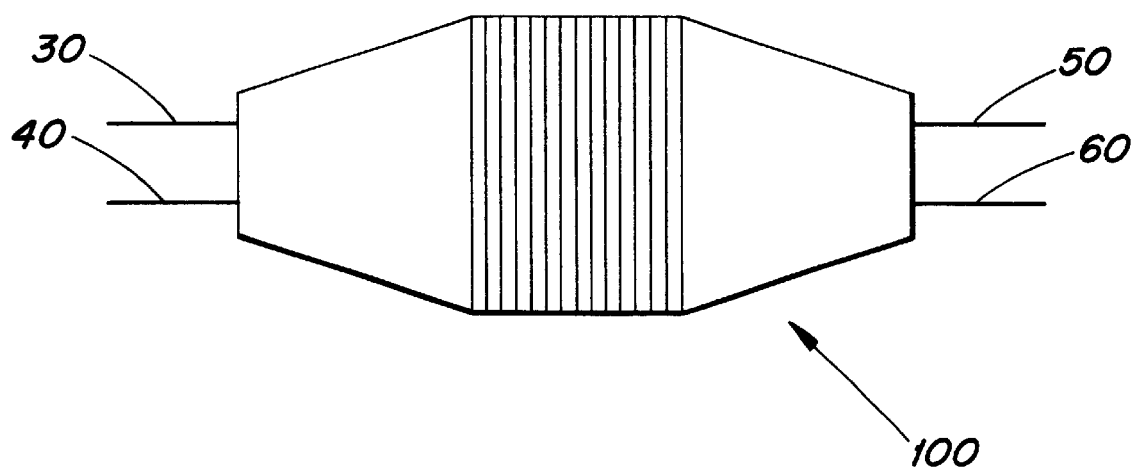
FIG. 2 illustrates an example of a symmetrical add/drop structure based on a so-called MMIbg principle.

FIG. 2 illustrates an example of a wavelength selective cross-switch structure 100 that can be used beneficially with the inventive wavelength selective modulator 1. In principle, the wavelength selective cross-switch structure 100 shown in FIG. 2 is a substantially symmetric add/drop mux element. The device shown specifically in FIG. 2 is called a symmetric MMI Bragg grating structure. Although any substantially symmetrical add/drop element that has the function of the cross-switch structure in FIG. 2 can be used, it is of the uttermost importance with respect to implementation of the component that said element need not be tuned. The wavelength selective modulator 1 can be easily rendered unmanageable when trimming is necessary and when relatively many wavelengths shall be handled, i.e. when many cross-switch structures 2, 4, 6, 8 are required.

An optical signal is, for instance, excited in at an access waveguide 40 in the cross-switch structure in FIG. 2. A channel is reflected to an access waveguide 30 and the remainder of the channels are transmitted to an access waveguide 50. Because of the reciprocity and the symmetry of the device, an optical signal that is excited into an access waveguide 60 will either be reflected to the access waveguide 50 or be transmitted to the access waveguide 30.

The cross-switch structure will preferably be symmetrical, in other words when the structure is divided in its middle, the two halves will be a mirror image of each other.

The passive adjustment section 30 can be used to optimise the transmission of those channels that are not reflected in any cross-switch structure.

The effective reflection depth in the cross-switch structures 2, 4, 6 and 8 will preferably lie as close as possible to the centre.

FIG. 3 illustrates another embodiment of the inventive wavelength selective modulator 11. A bandpass filter 80 and a receiver 90 are connected to one of the outgoing access waveguides provided on the second side of the second MMI waveguide. The bandpass filter is designed so as to allow through only that wavelength which it is desired to receive in the receiver 90. The illustrated embodiment is well suited as a combined add/drop multiplexer and modulator. The drop function is obtained by setting the phase control element of a wavelength channel so that said channel will be switched to the drop port. The add function is obtained by modulating one or more of the incoming non-modulated channels with the aid of the wavelength selected modulator function. A logic 1 will lie on the drop port for a given channel when a logic zero lies on the output port, and vice versa. As shown in FIG. 2, in order to prevent the out-channel from interfering with the dropped channel there may be included a bandpass filter 80 which will reduce or eliminate such effect.

The inventive wavelength selective modulator 1 can be produced in a monolithic semiconductor system or dielectric waveguide system of the $SiO_2/Si$-type.

The connecting waveguides of the wavelength selective modulator may all have the same length.

Respective phase control elements belonging to each of the cross-switch structures may change the phase to mutually the same extent. An array of phase control elements belonging to a given cross-switch structure, however, may deviate with respect to phase changes from an array of phase control elements that belong to another cross-switch structure. The phase control elements that belong to a given cross-switch structure will preferably change the phase to the same extent.

It will be understood that the invention is not restricted to the aforedescribed and illustrated exemplifying embodiments thereof and that modifications can be made within the scope of the accompanying claims.

What is claimed is:

1. A wavelength selective modulator (1) for modulating optical wavelengths and including at least two multimode waveguides (10, 20), at least one wavelength selective cross-switch structure (2, 4, 6, 8), at least two phase control elements (C1, C2, D1, D2, E1, E2, F1, F2), and at least four connecting waveguides, wherein the wavelength selective cross-switch structure is disposed between a first multimode waveguide (10) and a second multimode waveguide (20), wherein the first multimode waveguide (10) is connected to at least one access waveguide on a first side and to at least two access waveguides on a second side, wherein the second multimode waveguide (20) is connected to at least two access waveguides on a first side and to at least one access waveguide on a second side, wherein said wavelength selective cross-switch structure is connected to at least two access waveguides on a first side and on a second side, wherein in respect of a wavelength selective cross-switch structure a first access waveguide on the second side of the first multimode waveguide is connected to a first access waveguide on the first side of the wavelength selective cross-switch structure via a first connecting waveguide, a second access waveguide on the second side of the first multimode waveguide is connected to a first access waveguide on the second side of said wavelength selective cross-switch structure via a second connecting waveguide, a second access waveguide on the first side of the wavelength selective cross-switch structure is connected to a first access waveguide on the first side of the second multimode waveguide via a third connecting waveguide, and a second access waveguide on the second side of the wavelength selective cross-switch structure is connected to a second access waveguide on the first side of the second multimode waveguide via a fourth connecting waveguide, wherein the phase control elements are arranged in the connecting waveguides on one side of the wavelength selective cross-switch structure, wherein a first phase control element (C1) is adapted to effect a phase change for a given time period $\Delta t1$ that is as many time units $\tau$ earlier than the time at which a second phase control element (C2) effects the phase change for a time period $\Delta t2$, said time difference corresponding to the time taken for the light to travel from a contemplated point (30) to the second phase control element (C2) or to the time taken for the light to travel from the first phase control element (C1) to the second phase control element (C1), wherein in the case of two or more wavelength selective cross-switch structures two phase control elements (D1, D2, E1, E2, F1 and F2) and two connecting waveguides are provided for each wavelength selective cross-switch structure, wherein each wavelength selective cross-switch structure has two phase control elements on the opposite side relative to a nearest adjacent wavelength selective cross-switch structure, and wherein the first of said phase control elements (D1, E1 and F1) is adapted to effect a phase change during a given time period $\Delta t1$ which is earlier than a phase change caused by the second phase control elements (D2, E2 and F2) during a time period $\Delta t2$ by a length of time corresponding to the time taken for transmitted or reflected light to travel to said second phase control elements (D2, E2 and F2) from the nearest adjacent phase control element, and wherein the wavelength selective cross-switch structures are mutually connected via connecting waveguides from one access waveguide on a first wavelength selective cross-switch structure to another access waveguide on an adjacent wavelength selective cross-switch structure, and wherein said access waveguides are chosen so as to lie closely adjacent one another and on mutually the same side.

2. A wavelength selective modulator (1) according to claim 1, characterised in that the multimode waveguide is an MMI waveguide.

3. A wavelength selective modulator (1) according to claim 2, characterised in that the wavelength selective cross-switch structure is symmetrical.

4. A wavelength selective modulator (1) according to claim 2, characterised in that the wavelength selective cross-switch structure (2, 4, 6, 8) is an MMI Bragg grating structure (100).

5. A wavelength selective modulator (1) according to claim 3, characterised in that the phase control elements (C1, C2, D1, D2, E1, E2, F1, F2) belonging to respective wavelength selective cross-switch structures change the phases to the same extent.

6. A wavelength selective modulator (1) according to claim 3, characterised in that the time duration $\Delta t1$ is equally as long as the time duration $\Delta t2$.

7. A wavelength selective modulator (1) according to claim 6, characterised in that all connecting waveguides have mutually the same length.

8. A wavelength selective modulator (1) according to claim 7, characterised in that for N-number of wavelength selective cross-switch structures, there are 2×N number of different Mach-Zehnder paths for N-number of different wavelengths.

9. A wavelength selective modulator (1) according to claim 1, characterised in that a receiver (90) is connected to an output of the second multimode waveguide (20) via a bandpass filter (80).

10. A method of modulating optical wavelength channels in an optical network, characterised by switching the optical wavelength channels to at least one access waveguide arranged on a first side of a first multimode waveguide;

transmitting the optical wavelength channels through said first multimode waveguide and imaging said waveguide channels on at least two connecting waveguides arranged on an opposite side relative to said access waveguide;

transmitting said optical wavelength channels through said connecting waveguides;

changing the phase of a reflecting wavelength two times for each wavelength selective cross-switch structure with the aid of two phase control elements arranged in a first and a second connecting waveguide on a first side of said wavelength selective cross-switch structure, wherein said phase is changed by a first phase control element over a given time period $\Delta t1$ which is earlier than the phase change caused by a second phase control element during a time period $\Delta t2$ by a length of time that which corresponds to the time taken for the light to travel from a contemplated point (70) to the second phase control element, or the time taken for the light to travel from the first phase control element to the second phase control element, at the same time as the phase of said reflecting wavelength on a second side of the wavelength selective cross-switch structure remains relative unchanged;

changing the phase of transmitting wavelengths for each wavelength selective cross-switch structure once in a first and a second direction per wavelength selective cross-switch structure;

switching the optical wavelength channels via at least two connecting waveguides in a second multimode waveguide; and wherein the phase relationship between the optical signal in respective access waveguides arranged on the first side of the second multimode waveguide determines where the optical signal will be focused on the second side of the second multimode waveguide for a given length-width ratio on said multimode waveguide.

11. A method according to claim 10, characterised in that the multimode waveguide is an MMI waveguide.

12. A method according to claim 10, characterised in that all connecting waveguides are of mutually the same length.

13. A method according to claim 10, characterised in that for N-number of wavelength selective cross-switch structures, there are 2×N-number of different Mach-Zehnder paths for N-number of different wavelengths.

14. A method according to claim 10, characterised in that the time period $\Delta t1$ is of the same duration as the time period $\Delta t2$.

* * * * *